United States Patent [19]

Burdette et al.

[11] 4,427,467

[45] Jan. 24, 1984

[54] LOW VISCOSITY AIR BREATHING MISSILE FUEL

[75] Inventors: George W. Burdette, Ridgecrest, Calif.; Lewis Hall, Chadds Ford, Pa.

[73] Assignee: The United States of America as represented by the Secretary of the Navy, Washington, D.C.

[21] Appl. No.: 373,080

[22] Filed: Apr. 29, 1982

[51] Int. Cl.³ ............................................. D03D 23/00
[52] U.S. Cl. .............................. 149/109.4; 149/109.6; 585/14; 585/22; 585/253; 585/362
[58] Field of Search ........................ 149/109.4, 109.6; 585/14, 22, 253, 362

[56] References Cited

U.S. PATENT DOCUMENTS 3,004,384  10/1961  Saunders .............................. 60/35.4
4,277,636   7/1981  Norton et al. ...................... 149/109.6

Primary Examiner—Stephen J. Lechert, Jr.
Attorney, Agent, or Firm—R. F. Beers; W. Thom Skeer; Bruce H. Cottrell

[57] ABSTRACT

An improved ramjet fuel consisting of hydrogenated hydrocarbons uses a minimum weight percentage of 50% tetrahydromethylcyclopentadiene dimer (TH-dimer) with about 50% by wt. exo-tetrahydrodicyclopentadiene (Exo-THDC). The mixture exceeds U.S. Navy flash point requirements of 60° C. while yielding a lower viscosity than TH-dimer alone. Volumetric heating properties of the mixture make it an excellent ramjet fuel.

2 Claims, No Drawings

LOW VISCOSITY AIR BREATHING MISSILE FUEL

BACKGROUND OF THE INVENTION

1. Field of the Invention

The present invention relates to liquid propellant fuels. More particularly the present invention relates to fuels for missile propellant applications. By way of further particularization the invention may be described as a general purpose completely hydrogenated hydrocarbon fuel.

2. Description of the Prior Art

There is a need for tactical air-launched missiles with significantly greater range capability. Because they utilize atmospheric oxygen as the oxidizer, air-breathing propulsion systems are more volumetrically efficient than conventional bipropellant liquid or solid propellant rockets for a given missile size and thus have the potential to fill this need. Even so air launched tactical missiles are quite volume limited, and therefore the most desirable fuels for this type missile system are those that contribute the most range per unit volume.

A comparison of readily available liquid fuels suitable for use as air breather fuels indicate that hydrocarbons exhibit the highest heat of combustion. Although the heat of combustion of hydrocarbons may vary considerably, in general the volumetric heat of combustion of a liquid hydrocarbon increases with an increasing carbon to hydrogen ratio. Also, the viscosity generally increases as the density increases, and an acceptable compromise must be made to minimize pumping and injection requirements while maintaining maximum heating value.

Isomers of tetrahydromethylcyclopentadiene dimer (TH-dimer) and exo-tetrahydrodicyclopentadiene (Exo-THDC) are fuels known in the art, but each has its limitations. Exo-THDC has a low flash point and TH-dimer has high viscosity. The Navy has a requirement for a fuel which has viscosity as low as possible and a flash point of at least 60° C. or greater.

SUMMARY OF THE INVENTION

The composition of the present invention is a blend of exo-tetrahydrodicyclopentadiene and isomers of tetrahydromethylcyclopentadiene dimer (MIL F-82522A [OS] 8 OCT 1971). The blend preferably contains about 50 to 75% by weight TH-dimer and about 50 to 25% by weight Exo-THDC.

OBJECTS OF THE INVENTION

It is an object of the invention to produce a missile fuel having a flash point minimum of 60° C. and a freezing point of −40° C. or lower.

A further object of the invention is to provide a missile fuel which has a heat of combustion in excess of 140,000 Btu/gal.

It is a further object of this invention to provide a missile fuel with the above characteristics which also has a maximum viscosity of 30 centistokes at 40° C.

These and other objects and features of the invention will become apparent from a study of the following description.

DESCRIPTION OF THE PREFERRED EMBODIMENT

The air breathing missile fuel tetrahydromethylcyclopentadiene dimer (TH-dimer) exhibits a flash point that is acceptable to the Navy, i.e. greater than 60° C., and a viscosity that is acceptable but higher than desired, to-wit: 60 centipoises at −40° C.

The jet-fuel Exo-Tetrahydrodicyclopentadiene (Exo-THDC) exhibits a medium value for volumetric heat of combustion and a very low viscosity at low temperature; however its flash point is well below the 60° C. required by the Navy.

It has been found that certain mixtures of TH-dimer and Exo-THDC exhibit a flash point of 60° C. or greater, a much lower viscosity than TH-dimer, and a net heat of combustion between the values for TH-dimer/Exo-THDC. The mixtures therefore are more ideal than either of said fuels alone.

Table 1 below shows some properties of TH-dimer, Exo-THDC, a 50:50 mixture of said fuels and a 75% TH-dimer:25% Exo-THDC mixture. The data shown in Table 1 is for mixtures of a military specification TH-dimer and Exo-THDC.

TABLE I
PROPERTIES OF LIQUID HYDROCARBON FUELS

| Property | TH-dimer | Exo-THDC | TH-dimer/Exo-THDC by weight | |
|---|---|---|---|---|
| | | | 50%/50% | 75%/25% |
| Flash Pt. °C. | 71° | 56° | 60° | 66° |
| Volumetric heating value BTU/gal | 140,000 | 141,700 | *140,900 | *140,500 |
| Viscosity −40° C. Centipoises | 60 | 17 | 28.9 | *45 |
| Density g/cc | 0.9196 | 0.9360 | *0.930 | *0.925 |

*Approximate

As the percentage of Exo-THDC is decreased, the flash point will increase as well as the viscosity. Thus mixtures containing at least 50% by weight Exo-THDC and up to 50% by weight TH-dimer would meet the Navy's flash point requirements with improved viscosity characteristics. The physical properties would tend toward those of the TH-dimer as the amount of Exo-THDC is reduced. Thus it should be appreciated that the fuel composition of the invention achieves its objectives in providing a fuel which has a low viscosity, results in better ignition and combustion at lower temperatures, and has a flash point greater than 60° C. The blended fuel composition has far superior properties than either of its components.

The properties of the fuel composition of the present invention may further be improved by the addition of a small weight percent of a $C_5$–$C_7$ alkane or cycloalkane and including mixtures thereof. The properties of the fuel composition with the alkanes added may further be enhanced by the inclusion of a small weight percent of a blend of a tripartite oligomer of cyclopentadiene and or methylcyclopentadiene.

Obviously many modifications and variations of the present invention are possible in light of the above teachings. It is therefore to be understood that within the scope of the appended claims the invention may be practiced otherwise than as specifically described.

What is claimed is:

1. A fuel composition comprising:
   about 50 to 75% by weight exo-tetrahydrodicyclopentadiene and about 25 to 50% by weight tetrahydromethylcyclopentadiene dimer.

2. A composition according to claim 1 comprising:
   about 25% by weight exo-tetrahydrodicyclopentadiene and about 75% by weight tetrahydromethylcyclopentadiene dimer.

* * * * *